(12) United States Patent
Stelzer et al.

(10) Patent No.: US 11,886,060 B2
(45) Date of Patent: Jan. 30, 2024

(54) METHOD FOR ELECTRICALLY CONTROLLING A FUNCTIONAL ELEMENT

(71) Applicant: SAINT-GOBAIN GLASS FRANCE, Courbevoie (FR)

(72) Inventors: Richard Stelzer, Düsseldorf (DE); Bastian Klauss, Kempen (DE); Michael Zeiss, Heinsberg-Haaren (DE); Doane Shelby Craig, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/924,592

(22) PCT Filed: Jun. 22, 2021

(86) PCT No.: PCT/EP2021/067014
§ 371 (c)(1),
(2) Date: Nov. 10, 2022

(87) PCT Pub. No.: WO2021/259937
PCT Pub. Date: Dec. 30, 2021

(65) Prior Publication Data
US 2023/0229033 A1      Jul. 20, 2023

(30) Foreign Application Priority Data

Jun. 25, 2020   (EP) .................................. 20182187

(51) Int. Cl.
*G02F 1/133*     (2006.01)
*B32B 3/08*      (2006.01)
(Continued)

(52) U.S. Cl.
CPC ............ *G02F 1/13318* (2013.01); *B32B 3/08* (2013.01); *B32B 17/10467* (2013.01); *B60J 3/04* (2013.01);
(Continued)

(58) Field of Classification Search
None
See application file for complete search history.

(56) References Cited

U.S. PATENT DOCUMENTS

| | | | |
|---|---|---|---|
| 2009/0290078 A1* | 11/2009 | Yang | G02F 1/13718 349/35 |
| 2012/0026573 A1* | 2/2012 | Collins | B32B 17/10908 29/829 |

(Continued)

FOREIGN PATENT DOCUMENTS

| | | |
|---|---|---|
| DE | 43 28 726 A1 | 3/1995 |
| EP | 0 876 608 B1 | 4/2002 |

(Continued)

OTHER PUBLICATIONS

International Search Report as issued in International Patent Application No. PCT/EP2021/067014, dated Oct. 5, 2021.

*Primary Examiner* — Ryan Crockett
(74) *Attorney, Agent, or Firm* — Pillsbury Winthrop Shaw Pittman LLP

(57) ABSTRACT

A method for electrically controlling at least one functional element having electrically controllable optical properties, wherein the optical properties are controlled by a control unit, wherein the control unit is connected to at least two transparent flat electrodes of the functional element, and an electrical voltage is applied between the flat electrodes by the control unit, wherein the electrical voltage has a periodic signal profile with a first, variably adjustable frequency and the glazing unit is surrounded by light beams of a second frequency, and wherein the light beams are sensed by a (Continued)

Figure 1:
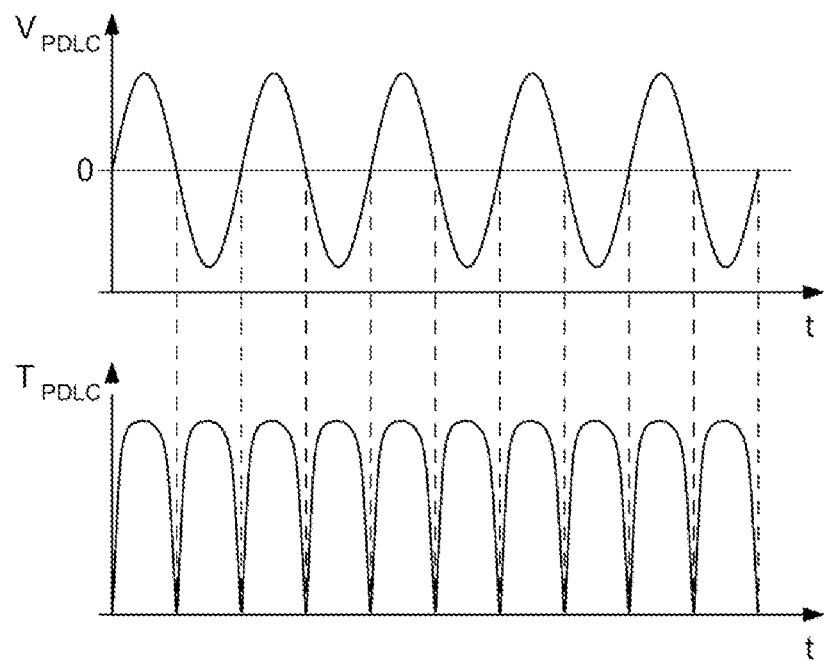

sensor unit and the first frequency is changed as a function of the second frequency, wherein the first frequency is synchronized with the second frequency.

19 Claims, 3 Drawing Sheets

(51) Int. Cl.
- *B32B 17/10* (2006.01)
- *B60J 3/04* (2006.01)
- *E06B 9/24* (2006.01)
- *G02F 1/1334* (2006.01)
- *G02F 1/1343* (2006.01)
- *B32B 27/08* (2006.01)

(52) U.S. Cl.
CPC .............. *E06B 9/24* (2013.01); *G02F 1/1334* (2013.01); *G02F 1/13439* (2013.01); *B32B 17/10036* (2013.01); *B32B 17/1055* (2013.01); *B32B 27/08* (2013.01); *B32B 2419/00* (2013.01); *B32B 2605/00* (2013.01); *E06B 2009/2464* (2013.01)

(56) References Cited

U.S. PATENT DOCUMENTS

| | | | |
|---|---|---|---|
| 2016/0314750 A1* | 10/2016 | Harris | G02F 1/1345 |
| 2017/0090224 A1* | 3/2017 | Vivier | G02F 1/1334 |
| 2017/0351155 A1* | 12/2017 | Paolini, Jr. | C08J 7/18 |
| 2020/0133042 A1* | 4/2020 | Manz | B32B 17/10036 |

FOREIGN PATENT DOCUMENTS

| | | |
|---|---|---|
| WO | WO 2011/033313 A1 | 3/2011 |
| WO | WO 2012/007334 A1 | 1/2012 |

* cited by examiner

METHOD FOR ELECTRICALLY CONTROLLING A FUNCTIONAL ELEMENT

CROSS-REFERENCE TO RELATED APPLICATIONS

This application is the U.S. National Stage of PCT/EP2021/067014, filed Jun. 22, 2021, which in turn claims priority to European patent application number 20182187.3 filed Jun. 25, 2020. The content of these applications are incorporated herein by reference in their entireties.

The invention relates to a method for controlling a functional element and to a glazing assembly that uses such methods.

Functional elements having electrically controllable optical properties are used in the industrial production of glazing units. Such glazing units are often composite panes in which a functional element is embedded. The composite panes consist of at least one outer pane, one inner pane, and one adhesive intermediate layer that joins the outer pane to the inner pane surface-to-surface. Typical intermediate layers are polyvinyl butyral films, which have, in addition to their adhesive properties, high toughness and high acoustic damping. The intermediate layer prevents disintegration of the composite glass pane in the event of damage. The composite pane merely cracks, but remains dimensionally stable.

Composite panes having electrically controllable optical properties are known from the prior art. Such composite panes contain a functional element that typically contains an active layer between two flat electrodes. The optical properties of the active layer can be changed by an electrical voltage applied on the flat electrodes. Electrochromic functional elements, known, for example, from US 20120026573 A1 and WO 2012007334 A1, are an example of this. SPD functional elements (suspended particle device) or PDLC functional elements (polymer dispersed liquid crystal), known, for example, from EP 0876608 B1 and WO 2011033313 A1, are another example. As a result of the voltage applied, the transmittance of visible light through electrochromic or SPD/PDLC functional elements can be controlled.

SPD and PDLC functional elements are commercially available as multilayer films. The flat electrodes required for applying a voltage are arranged between two PET carrier films. During the production of the glazing unit, the functional element is cut from the multilayer film in the desired size and shape and inserted between the films of an intermediate layer. The flat electrodes are electrically conductively connected to a control module (ECU) via flat conductors outside the composite pane. The control module is designed for applying the electrical voltage, in particular an AC voltage with a frequency of, for example, 50 Hz, between the flat electrodes. It is known that a PDLC functional element exhibits coherence between a turbid transparency state and a current value of its supply voltage. If a light source (e.g., neon tubes, some LED lamps) is present in the vicinity of the PDLC functional element and the light source has a non-homogeneous intensity with a similar frequency, an observer would perceive this as disturbing flickering or as a variation in the transparency on the PDLC functional element.

FIG. 1 shows a profile of an AC voltage ($V_{PDLC}$) applied to a PDLC functional element and the transparency behavior of the PDLC functional element as a function of time. The reduction in transparency ($T_{PDLC}$) at the zero crossing of the PDLC AC voltage can be clearly seen. The transparency has a residual waviness.

Figure 2:
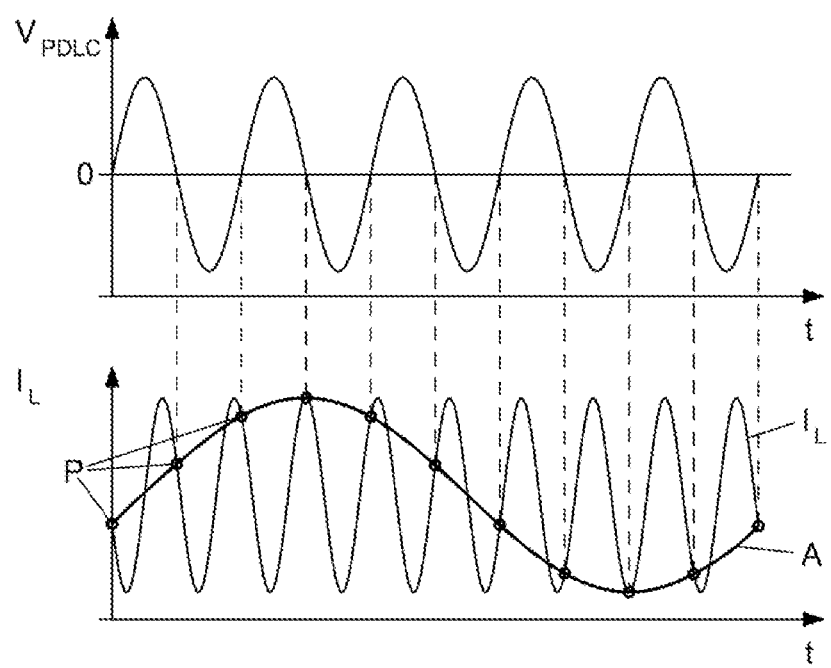

FIG. 2 shows the profile of the AC voltage ($V_{PDLC}$) and a light intensity of an external light source. The light source illuminates the PDLC functional element and has an inhomogeneous intensity ($I_L$) at a frequency that deviates slightly from the frequency of the AC voltage of the PDLC functional element. Comparing the times when the PDLC functional element appears nontransparent and the light source is simultaneously illuminated, i.e., has an intensity $I_L>0$, a flickering of the PDLC for element is clearly perceived by the observer. This can lead to a so-called aliasing effect A (beat effect). At time points P in FIG. 2, the PDLC functional element is less transparent or even non-transparent. When these time points are connected to form a curve A, a profile of the curve A arises that represents a transparency perceived by the observer. This perception of the PDLC functional element has an irritating and disturbing effect on the observer.

US 2020/133042 discloses a device for operating a functional element having electrically controllable optical properties. The device includes an electrical energy source that is electrically conductively connected to the functional element via two supply lines.

The object of the present invention consists in providing a method that improves the optical properties, in particular reduces flickering of the glazing assembly having electrically controllable optical properties.

The object of the present invention is accomplished according to the invention by a method in accordance with claim 1. Preferred embodiments are apparent from the dependent claims.

The method according to the invention for electrically controlling a functional element having electrically controllable optical properties, comprises at least that the optical properties are controlled by means of a control unit, with the control unit being connected to at least two transparent flat electrodes of the functional element, an electrical voltage is applied between the flat electrodes by means of the control unit.

The electrical voltage has a periodic signal profile with a first frequency. The frequency is variably adjustable. In other words, the periodic voltage is an AC voltage. A glazing unit is surrounded by light beams of a second frequency; the light beams are detected by means of a sensor unit, and the first frequency is changed as a function of the second frequency.

In one embodiment, the functional element is embedded in the glazing unit. In the context of the invention, a "glazing unit" in the general sense means a product that can be used for closing window openings of a vehicle or a building, either directly (frameless) or after insertion into a suitable frame. In modern motor vehicles, these are generally composite glass panes; and in new construction in the mid-latitudes and northern latitudes, insulating glazings; however, the invention is not limited to such glazings. Alternatively, the functional element can be bonded to a substrate made of glass, plastic, or acrylic glass.

The glazing unit comprises at least one outer pane and one inner pane joined to one another via a thermoplastic intermediate layer, with the functional element embedded in the glazing unit. In the context of the invention, "inner pane" refers to the pane facing the interior. "Outer pane" refers to the pane facing the external environment.

It is an idea of the invention not to carry out the function for controlling the functional element based on a stored frequency. Instead, for example, a measurement of the frequency of the actual ambient light is determined at prespecified time intervals. In order to better adapt the first frequency of the voltage to the ambient light, a difference measurement is made, i.e., a difference between the first frequency and the second frequency of the ambient light is determined. From this measurement, a correction value can be inferred and the first frequency can be adjusted accordingly by increasing or reducing by the correction value. Thus, a frequency adjustment takes place. Interference effects are thus avoided. The first frequency can be in an operating range of, for example, 40 to 80 Hz.

With the invention, the flickering of the transparency of the functional element perceived by an observer can be significantly reduced. This also makes it possible to achieve a perceptible increase in the utility value for the observer, contributing to an increase in the marketing outlook for such glazing units.

The glazing unit is surrounded by ambient light that is generated by an illuminant, in particular an LED or a fluorescent lamp. The ambient light has light beams that are characterized by a second frequency. The light beams are detected by a sensor unit such that the second frequency can be determined.

The invention provides the advantage that the voltage can be operated at a frequency that generates virtually constant transparency of the glazing unit, i.e., achieves the effect of constant transparency. Because of the fact that the first frequency of the voltage is adjusted to the second frequency of the light beams, flickering of the glazing unit can be reduced particularly effectively. Due to the synchronization of the frequencies, the transparency of the functional module appears almost flicker-free.

In an advantageous embodiment, the phase of the voltage applied can be adjusted such that the minimum of the transparency of the functional module is synchronized with the minimum of the light intensity of the ambient light in order to achieve minimum perceived haze.

The sensor unit has at least one light sensor. The light sensor is designed to detect the light in the environment, a frequency, and/or the brightness of the light emitted by the illuminant. The light sensor should detect light in the visible spectral range. Advantageously, the spectral sensitivity distribution should be aligned with that of the human eye such that the values measured coincide with those of the light perceived by the human observer as closely as possible. The light sensor should operate with a minimum sampling frequency that is greater than twice, advantageously four times, the first frequency of the functional element.

The sensor unit can be part of the glazing unit by being arranged on the composite pane. Preferably, the sensor unit is embedded between the outer pane and the inner pane in the intermediate layer. The sensor unit is preferably arranged completely within the interior of the glazing unit. Furthermore, the sensor unit can be situated on a printed circuit board that has at least one phototransistor arranged thereon. The sensor unit is suitable for detecting a certain amount of ambient light. It is connected to the control unit, in particular to evaluation electronics of a vehicle. A signal detected by the sensor unit is forwarded to the control unit for evaluating. In buildings, the sensor unit can advantageously be arranged in a space outside the glazing unit.

The second frequency is detected by means of the sensor unit. The sensor unit can be a light sensor, in particular a phototransistor, a photodiode, a photocell, a photoresistor, and/or a CMOS/CCD sensor. Particularly good light sensitivity is achieved by the phototransistor. In a preferred embodiment, the photodiode can be an SMD component. If the photodiode is an SMD component, an SMD printed circuit board is expediently used. The printed circuit board can be arranged directly on one of the panes, in particular with the side facing away from the photodiode on the outer surface of the inner pane. It has been demonstrated that the presence of the localized printed circuit board does not result in a substantial reduction in the stability of the laminate. However, the printed circuit board can also be arranged between two thermoplastic layers, i.e., between two plies of the thermoplastic intermediate layer.

The sensor unit can, for example, be provided to detect the light beams at regular time intervals. Advantageously, the sensor unit is arranged in the immediate vicinity of the functional element. Since the sensor unit is intended to detect the ambient light, it can be arranged wherever the ambient light can directly or indirectly strike a sensor surface of the sensor unit. The sensor unit can be arranged at a distance of approx. 5 mm from the functional element.

The control unit has means for determining the second frequency from the signal transmitted by the sensor unit. Furthermore, the control unit compares the first frequency with the second frequency. If a difference is found, the first frequency is then changed as a function of the second frequency. The functional element is then controlled with a changed first frequency.

The first frequency can preferably be adjusted to the second frequency to adapt it to the current characteristics or properties of the illuminant.

The glazing unit includes a functional element having electrically controllable optical properties that is embedded in the intermediate layer. The functional element is typically arranged between at least two layers of thermoplastic material of the intermediate layer, wherein it is connected to the outer pane by the first layer and to the inner pane by the second layer.

Such a functional element comprises at least one active layer that is arranged between a first carrier film and a second carrier film. The active layer has the variable optical properties that can be controlled by an electrical voltage applied to the active layer. In the context of the invention, "electrically controllable optical properties" means those properties that are continuously controllable but equally those that can be switched between two or more discrete states. The optical properties relate in particular to light transmittance and/or to scattering behavior. The functional element further comprises flat electrodes for applying the voltage to the active layer; they are preferably arranged between the carrier films and the active layer.

In an advantageous embodiment, the functional element is a PDLC functional element, in particular one that switches at least one region of the glazing unit from a transparent state to an opaque state and vice versa. The active layer of a PDLC functional element contains liquid crystals that are embedded in a polymer matrix. In another preferred embodiment, the functional element is an SPD functional element. In this case, the active layer contains suspended particles, wherein the absorption of light by the active layer can be varied by applying a voltage to the flat electrodes.

The flat electrodes and the active layer are arranged substantially parallel to the surfaces of the outer pane and the inner pane. The flat electrodes are connected to an external voltage source. The electrical contacting, as well as the connection to the energy source of the active layer, is done by suitable connecting cables, for example, flat conductors or foil conductors that are optionally connected to the flat electrodes via so-called bus bars, for example, strips of an electrically conductive material or electrically conductive imprints. The thickness of the functional element is, for example, from 0.4 mm to 1 mm.

The flat electrodes are preferably configured as transparent, electrically conductive layers. The flat electrodes preferably contain at least a metal, a metal alloy, or a transparent conducting oxide (TCO). The flat electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The flat electrodes preferably have a thickness of 10 nm (manometers) to 2 μm (microns), particularly preferably 20 nm to 1 μm, most particularly preferably 30 nm to 500 nm.

The invention further includes a glazing assembly of a vehicle or a building for carrying out the method according to the invention, at least comprising
- a glazing unit having electrically controllable optical properties, which comprises an outer pane and an inner pane that are joined to one another via a thermoplastic intermediate layer, and in which a functional element having electrically controllable optical properties is embedded, comprising an active layer, with which transparent flat electrodes are associated on both surfaces, and
- a control unit for electrically controlling the optical properties of the glazing unit, which is connected to the flat electrodes of the functional element and is designed for applying an electrical voltage with a first frequency between the flat electrodes, wherein a sensor unit is provided for sensing the light beams of a second frequency surrounding the glazing unit.

Consequently, a sensor unit is provided that can be also integrated in a glazing unit, a composite pane, or a building pane or a motor vehicle pane. The sensor unit can be provided for forwarding detected signals or data to the control unit.

The control unit can be provided for evaluating the detected data and for synchronizing the first frequency to the second frequency.

In a preferred embodiment, the sensor unit is arranged on the glazing unit. The sensor unit has a light sensor, in particular a phototransistor, the upper limit frequency of which is at least 160 Hz.

The outer pane and the inner pane are preferably made of glass, in particular of soda lime glass, which is customary for window panes. The panes can, in principle, also be manufactured from other types of glass (for example, borosilicate glass, quartz glass, aluminosilicate glass) or transparent plastics (for example, polymethyl methacrylate or polycarbonate). The thickness of the outer pane and the inner pane can vary widely. Preferably, panes with a thickness in the range from 0.8 mm to 5 mm, preferably from 1.4 mm to 2.5 mm are used, for example, those with the standard thicknesses of 1.6 mm or 2.1 mm.

The outer pane, the inner pane, and the thermoplastic intermediate layer can be clear and colorless, but also tinted or colored. A corresponding windshield must have sufficient light transmittance in the central field of vision, preferably at least 70% in the primary through-vision region A in accordance with ECE-R43. The outer pane and the inner panes can, independently of one another, be non-tempered, partially tempered, or tempered. If at least one of the panes is to be tempered, this can be thermal or chemical tempering.

The outer pane, the inner pane, and/or the intermediate layer can have other suitable coatings known per se, for example, antireflection coatings, non-stick coatings, anti-scratch coatings, photocatalytic coatings, or solar protection coatings, or low-E coatings.

The glazing unit can be produced by methods known per se. The outer pane and the inner pane are laminated to one another via the intermediate layer, for example, by autoclave methods, vacuum bag methods, vacuum ring methods, calender methods, vacuum laminators, or combinations thereof. The joining of the outer pane and the inner pane is usually done under the action of heat, vacuum, and/or pressure.

According to another aspect of the invention, a vehicle, in particular a passenger car, with the glazing assembly according to the invention is described.

Another aspect of the invention includes the use of the glazing assembly according to the invention in means of transportation for travel on land, in the air, or on water, in particular in motor vehicles, for example, as a windshield, rear window, side window, and/or roof panel and as a functional individual piece, and as a built-in part in furniture, appliances, and buildings.

In the following, the invention is explained in detail with reference to drawings and exemplary embodiments. The drawings are schematic representations and not to scale. The drawings in no way restrict the invention.

Figure 3:
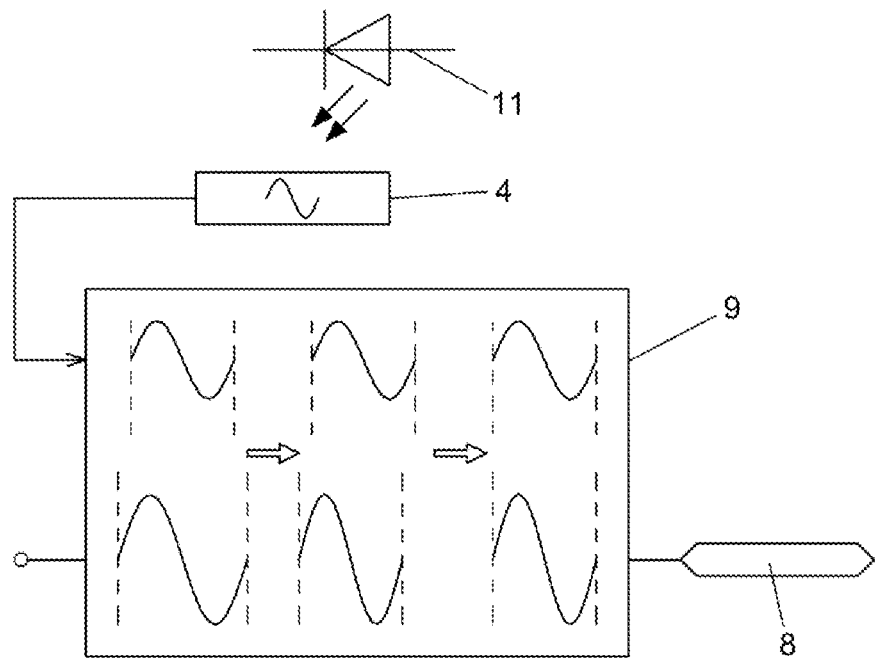
Figure 4:
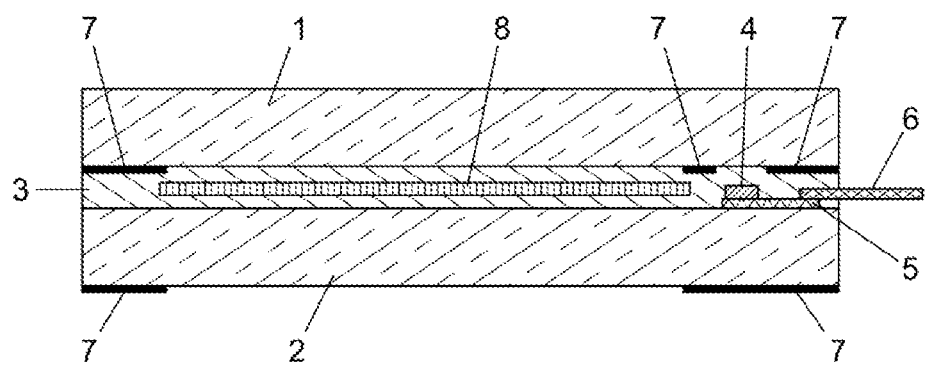
Figure 5:
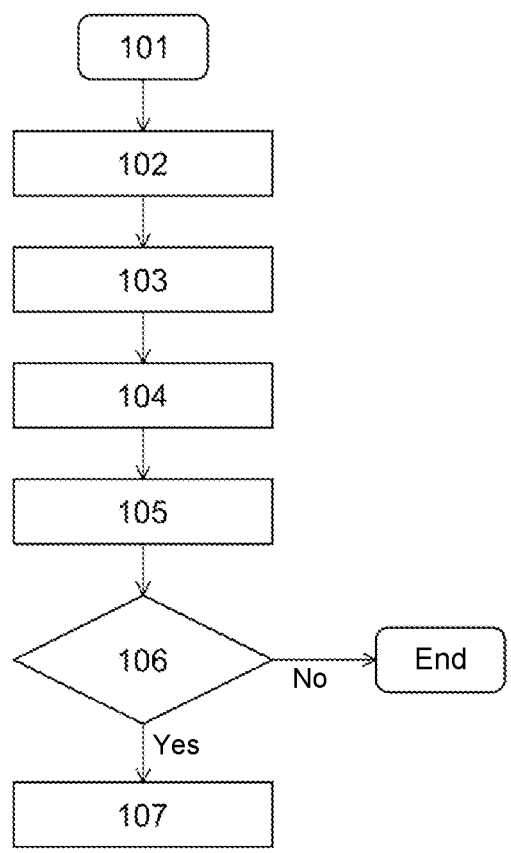

They depict:

FIG. 1 a profile of an electrical voltage applied to the PDLC functional element and the transparency from the prior art, FIG. 2 a profile of the electrical voltage applied to the PDLC functional element and a profile of the intensity of an external light source from the prior art, FIG. 3 a schematic arrangement according to one embodiment of the invention, FIG. 4 a cross-section through a glazing unit according to the invention, and FIG. 5 an exemplary method sequence.

Data with numerical values are generally not to be understood as exact values, but also include a tolerance of ±1% up to ±10%.

FIG. 3 depicts a schematic glazing assembly 100 according to the invention. A sensor unit 4 is shown, in particular a light sensor that is connected to a control unit 9. The control unit 9 (also referred to as an ECU in a motor vehicle) supplies the PDLC functional element 8 with a supply voltage and is provided for controlling the PDLC functional element 8. For this purpose, the control unit 9 is connected to the PDLC functional element 8 and in particular to two transparent PDLC flat electrodes of the PDLC functional element 8. The supply voltage is an electrical voltage, in particular an AC voltage having a periodic signal profile with a first frequency F1.

The sensor unit 4 detects the ambient light of the PDLC for element 8 produced by a light source 11 (LED) and sends a signal to the control unit 9 for evaluation. The control unit 9 has a microprocessor for evaluating the signal. The ambient light is generated by an illuminant, for example, an LED. The light beams of the ambient light have a second frequency F2.

In the control unit 9, the first frequency F1 is compared with the second frequency F2. If a difference between the first frequency F1 and the second frequency F2 is found, the first frequency F1 is then changed and adjusted to the second frequency F2.

Also, the sensor unit 4 can repeatedly sample the ambient light at regular time intervals.

FIG. 4 depicts an embodiment of a glazing unit 10 according to the invention with the integrated sensor unit 4. The glazing unit 10 is a composite pane that is constructed from an outer pane 1 (with an exterior-side surface I and an interior-side surface II) and an inner pane 2 (with an exterior-side surface III and an interior-side surface Iv). The outer pane 1 is joined to the inner pane 2 surface-to-surface via a thermoplastic intermediate layer 3. The outer pane 1 and the inner pane 2 are made of soda lime glass and have, for example, a thickness of 2.1 mm. The intermediate layer 3 is formed from a film of polyvinyl butyral (PVB) approx. 0.76 mm thick. The glazing unit 10 is intended as a windshield of a motor vehicle.

The glazing unit 10 is equipped, in a central region, with the PDLC functional element 8, which is embedded in the intermediate layer 3. The intermediate layer 3 comprises a total of three thermoplastic layers, each formed by a thermoplastic film with a thickness of approx. 0.38 mm made of PVB. The first thermoplastic layer is bonded to the outer pane 1; the second thermoplastic layer is bonded to the inner pane 2. The third thermoplastic layer interposed therebetween surrounds the cut-to-size PDLC functional element 8 (PDLC multilayer film) substantially flush on all sides. The PDLC functional element 8 is thus embedded in thermoplastic material all around and protected thereby.

The glazing unit 10 is equipped with the sensor unit 4. The sensor unit 4 can comprise a flexible printed circuit board 5 that is equipped with a phototransistor. The printed circuit board 5 is arranged completely within the glazing unit 10. It rests directly on the exterior-side surface of the inner pane 2 and is bonded to the outer pane via the intermediate layer 3. It has two electrical connection surfaces (not shown), that are in each case soldered to one pole of a two-pole flat conductor as connection cable 6. The connection cable 6 extends out of the composite via an edge of the glazing unit 10. The connection cables 6 serve to electrically connect the printed circuit boards 5 to the control unit 9 by additional connection cables (typically round cables). The control unit 9 analyzes the signals of the sensor unit 4—thus, the control unit 9 can, for example, adjust the first frequency F1 of the voltage applied to the PDLC functional element as a function of the second frequency F2 of the ambient light.

Photodiodes are also suitable as sensor unit 4, for example. They advantageously have small dimensions (height 0.55 mm, width 1.6 mm, depth 1.5 mm) and a spectral sensitivity distribution that mimics that of the human eye in a good approximation. The sensitivity maximum is approx. 500 nm; and, in the entire range from 500 nm to 600 nm, the sensitivity is more than 60% of the maximum value at 500 nm. This ensures that the amount of light measured by the light sensor also coincides with that considered relevant by humans.

The printed circuit board 5 is a flexible printed circuit board, comprising a polyimide film approx. 150 µm thick and conductor tracks printed thereon. Each printed circuit board 5 is T-shaped and has a thinner lead section and a wide end section (corresponding to the "crossbar of the T"), and wherein the lead section faces the edge of the glazing unit 10. The lead section has, for example, a width of 50 mm and a length of 65 mm. The end section has, for example, a width of 200 mm and a length of 15 mm. The sensor unit 4 is arranged in the end section of the printed circuit board 5, while the lead section is used for the connection with the connection cable 6. Arranged at the end of the lead section are two connection surfaces (not shown) that correspond to the two poles of the system on conductor tracks and that are in each case soldered to one pole of the two-pole connection cable 6.

The glazing unit 10 has, as is customary for windshields, a frame-like masking print 7. The masking print 7 is implemented as a printed and baked black enamel on the interior-side surfaces of the outer pane 1 and the inner pane 2. The printed circuit board 5 is arranged in the region of the masking print 7 such that it is visible neither from the outside nor the inside. The outer masking print 7 on the outer pane 1 has a cut-out at the location of the sensor unit 4 such that light can fall on the sensor unit 4 and the light sensor can fulfill its function.

FIG. 5 depicts an exemplary embodiment of a method according to the invention that can comprise the following steps:

Applying an AC electrical voltage having the first frequency F1 to the flat electrodes by means of the control unit 9 (step 101), Illuminating the glazing unit 10 with an illuminant (light source 11), for example, an LED (step 102), Detecting the light beams emitted by the illuminant by means of the sensor unit 4 (103), Forwarding a detected signal from the sensor unit to the control unit 9 (104), Determining the second frequency F2 from the detected signal by means of the control unit 9 (105), Comparing the first and second frequency F1, F2 by means of the control unit 9 (step 106), Adjusting the first frequency F1 to the second frequency F2, if a difference between the first frequency F1 and the second frequency F2 was found and controlling the PDLC functional element with a changed first frequency F1 (step 107).

According to the invention, glazing assemblies that have been successfully both improved in terms of optical performance and aesthetic appearance and further optimized compared to known glazing assemblies are provided using a method according to the invention. It was possible to achieve a virtually flicker-free glazing unit having a functional element. This result was unexpected and surprising for the person skilled in the art.

LIST OF REFERENCE CHARACTERS 1 outer pane
2 inner pane
3 thermoplastic intermediate layer
4 sensor unit
5 printed circuit board
6 connection cable/flat conductor
7 opaque masking print
8 PDLC functional element
9 control unit
10 glazing unit
11 light source
100 glazing assembly

The invention claimed is:

1. A method for electrically controlling at least one functional element having electrically controllable optical properties, the method comprising:
controlling the optical properties by a control unit, wherein the control unit is connected to at least two transparent flat electrodes of the at least one functional element, and
applying an electrical voltage between the at least two transparent flat electrodes by the control unit,
wherein the electrical voltage has a periodic signal profile with a first, variably adjustable frequency and a glazing unit is surrounded by light beams of a second frequency, and
wherein the light beams are sensed by a sensor unit and the first frequency is changed as a function of the second frequency, wherein the first frequency is synchronized with the second frequency.

2. The method according to claim 1, wherein the at least one functional element is embedded in a glazing unit, wherein the glazing unit comprises an outer pane and an inner pane that are joined to one another via a thermoplastic intermediate layer.

3. The method according to claim 1, wherein the second frequency is detected by a light sensor.

4. The method according to claim 3, wherein the light sensor is a phototransistor.

5. The method according to claim 1, wherein the sensor unit is part of a glazing unit.

6. The method according to claim 1, wherein a signal detected by the sensor unit is forwarded to the control unit.

7. The method according to claim 1, wherein the first frequency is compared with the second frequency by the control unit.

8. The method according to claim 1, wherein the first frequency is adjusted to the second frequency when a difference between the first frequency and the second frequency has been found.

9. The method according to claim 1, wherein the at least one functional element is a PDLC (polymer dispersed liquid crystal) functional element that makes a glazing unit appear transparent in at least some regions when a voltage supply is switched on and opaque when the voltage supply is switched off.

10. A glazing assembly of a vehicle or building for carrying out the method according to claim 1 comprising:
   a glazing unit having electrically controllable optical properties, which comprises an outer pane and an inner pane that are joined to one another via a thermoplastic intermediate layer and in which a functional element having electrically controllable optical properties is embedded, comprising an active layer, with which transparent flat electrodes are associated on both surfaces, and
   a control unit for electrically controlling the optical properties of the glazing unit, which is connected to the transparent flat electrodes of the functional element and is designed for applying an electrical voltage with a first frequency between the transparent flat electrodes,
   wherein a sensor unit is provided for sensing the light beams of a second frequency surrounding the glazing unit.

11. The glazing assembly according to claim 10, wherein the control unit is provided for synchronizing the first frequency to the second frequency.

12. The glazing assembly according to claim 10, wherein the sensor unit is provided for forwarding detected data to the control unit and the control unit is provided for evaluating the detected data.

13. The glazing assembly according to claim 10, wherein the sensor unit is arranged on the glazing unit.

14. The glazing assembly according to claim 10, wherein the sensor unit has a light sensor.

15. The glazing assembly according to claim 14, wherein the light sensor is a phototransistor.

16. The glazing assembly according to claim 10, further comprising a light source for generating light beams surrounding the glazing assembly.

17. The glazing assembly according to claim 16, wherein the light source is an LED module.

18. A vehicle comprising a glazing assembly according to claim 10.

19. The vehicle according to claim 18, wherein the vehicle is a passenger car.

* * * * *